United States Patent [19]

Bajer

[11] Patent Number: 4,490,197
[45] Date of Patent: Dec. 25, 1984

[54] TIRE CASING PREPARATION METHOD

[76] Inventor: Jacques J. Bajer, 16825 Kercheval Ave., Grosse Pointe, Mich. 48230

[21] Appl. No.: 524,927

[22] Filed: Aug. 22, 1983

[51] Int. Cl.³ .................. B29H 17/36; B29H 3/06; G01B 5/00
[52] U.S. Cl. .................. 156/64; 51/DIG. 33; 156/96; 156/111; 156/128.1; 156/247; 156/322; 156/378; 157/13; 264/36; 264/40.1; 264/DIG. 74
[58] Field of Search .............. 156/64, 378, 95, 96, 156/98, 110.1, 111, 128.1, 128.6, 129, 130, 130.3, 130.5, 130.7, 153, 154, 156, 247, 249, 322, 344, 909; 264/36, DIG. 74; 427/140; 157/13; 82/47; 73/146; 51/326, DIG. 33; 152/361 R, 361 FP, 361 DM

[56] References Cited

U.S. PATENT DOCUMENTS

| 3,117,047 | 1/1964 | Capistrant et al. | 156/96 X |
| 3,331,412 | 7/1967 | Sornsen | 156/96 X |
| 3,418,191 | 12/1968 | Dieckmann et al. | 156/378 X |
| 3,724,137 | 4/1973 | Hofelt, Jr. et al. | 156/64 X |
| 4,036,677 | 7/1977 | Marangoni | 156/96 X |
| 4,071,071 | 1/1978 | Graves et al. | 157/13 |

Primary Examiner—William A. Powell
Assistant Examiner—Thomas Bokan
Attorney, Agent, or Firm—Cullen, Sloman, Cantor, Grauer, Scott & Rutherford

[57] ABSTRACT

A tire casing preparation system including a transfer machine and associated with a plurality of work stations for performing a variety of operations on worn tire casings such as de-treading, contouring, surface conditioning, dimensional gauging, defect detection and adhesive treatment. The transfer machine includes a turntable having a plurality of chucking and rotating mechanisms for mounting and processing tire casings as they are moved from one work station to another. A tire casing is first transported to a de-treading station where it undergoes a rough machining or de-treading operation for forming a curvilinear surface on the upper outer periphery of the tire casing. The tire casing is then transported to a contouring work station where a semi-rough machining operation is performed to form an arcuate outer peripheral surface. Following the completion of the semi-rough machining operation, the tire casing is moved to a finishing and surface conditioning work station for finishing the machined contoured tire casing, and conditioning its outer machined surface area. Provision is also made for dimensionally gauging the finished machined tire casing and detecting any defects that may exist. The finished machined tire casing is then transported to an adhesive solution application work station where an adhesive solution is applied. The finished and prepared tire casing is finally removed from the turntable and transported to a separate work area where re-treading or re-manufacturing operations take place.

1 Claim, 5 Drawing Figures

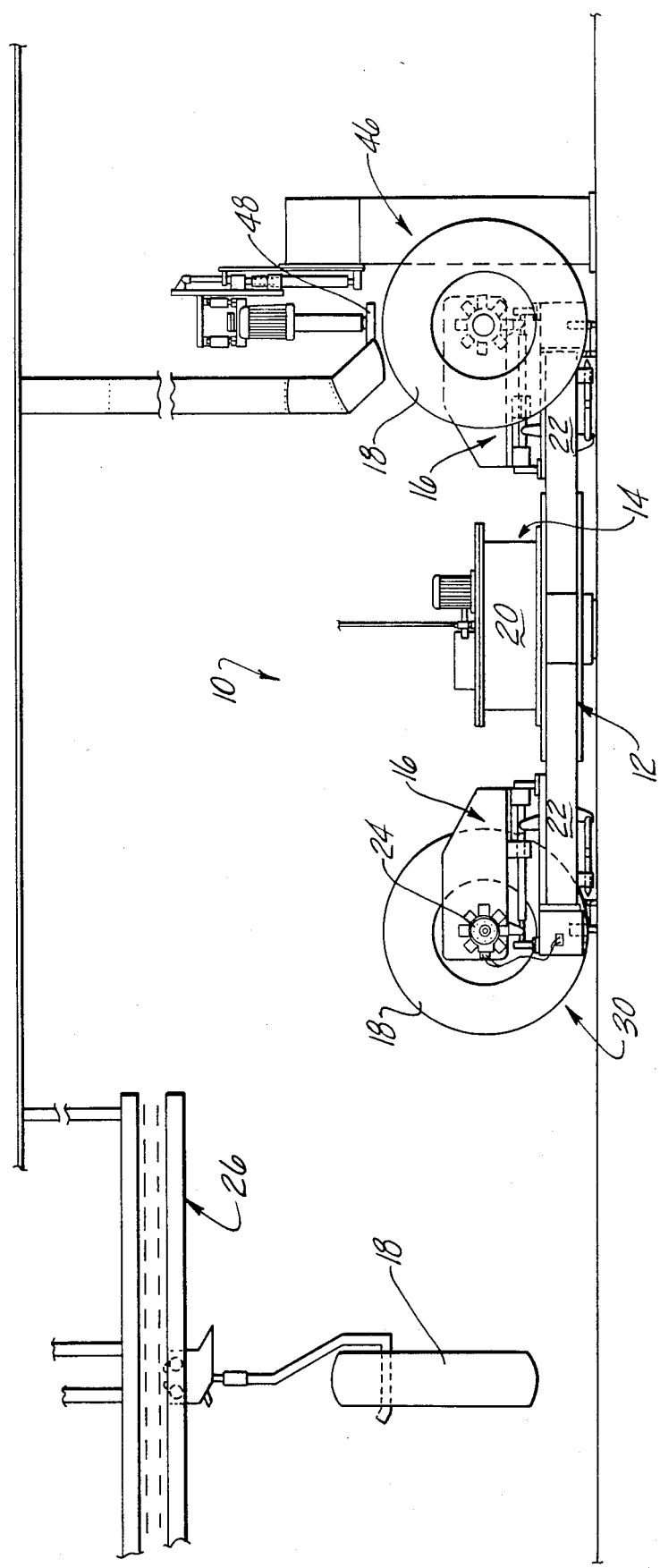

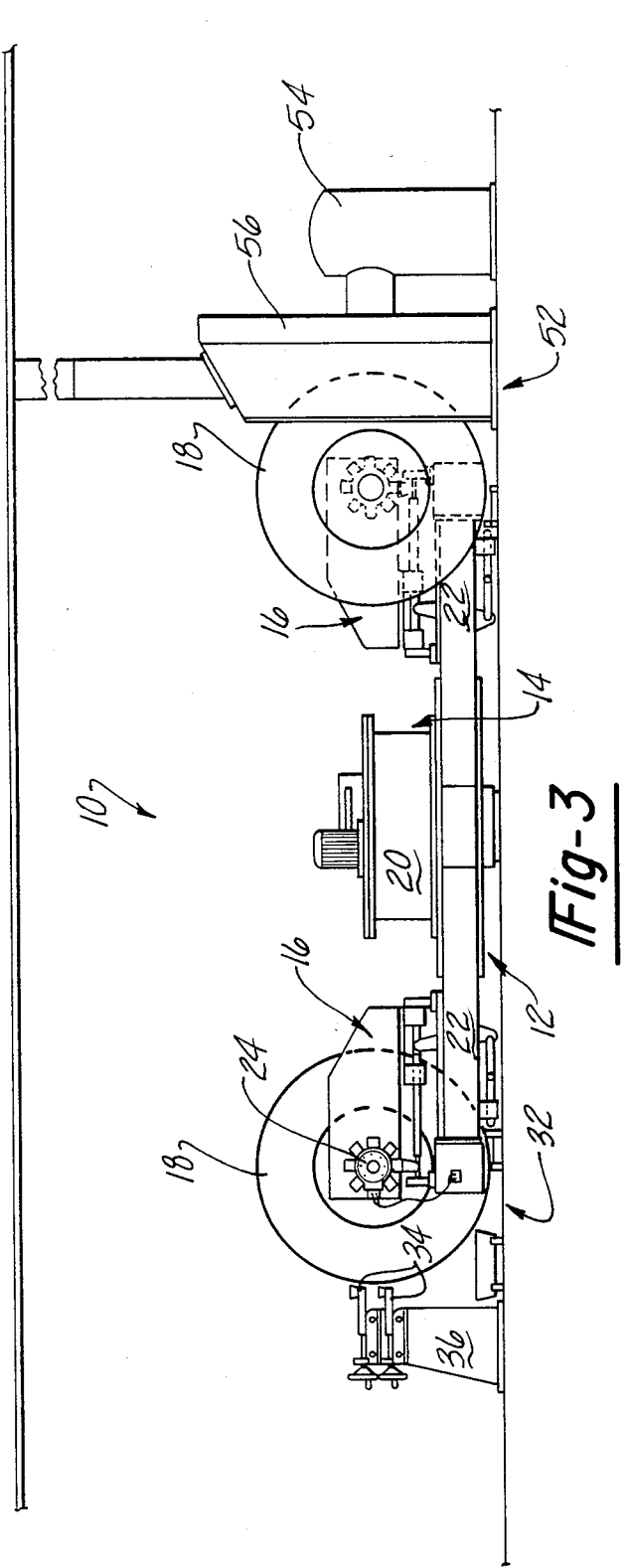
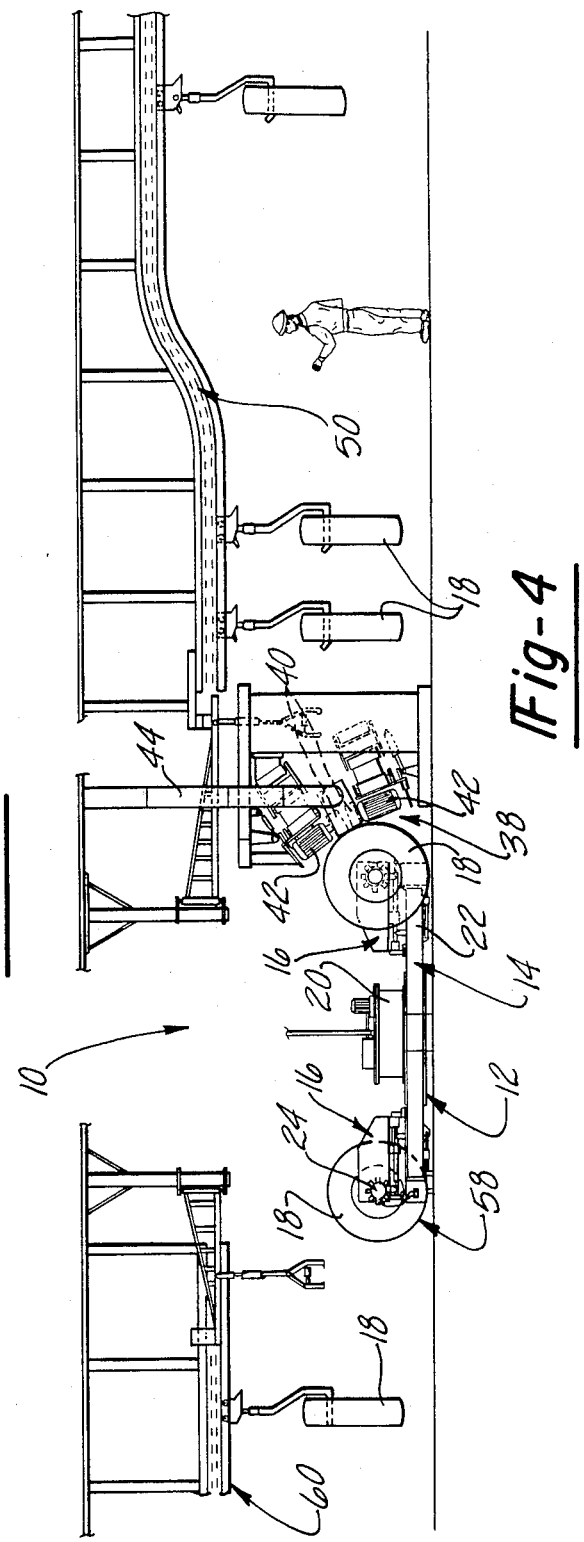

TIRE CASING PREPARATION METHOD

BACKGROUND OF THE INVENTION

The present invention relates to a tire casing preparation system for preparing worn tire casings for re-manufacturing or re-treading. The tire casing preparation system is also suitable for the preparation of new tire casings of the treadless type.

Tire casings are conventionally prepared for re-treading by means of a buffing machine consisting of a stationary assembly upon which the casing is mounted and inflated for a buffing operation. The quality, consistency, and productivity levels at which casings may be prepared using this known technique are quite limited. Further, since the tire casing is prepared at one stationary location, there has been little incentive or opportunity to improve the preparation operation because that would only add to the complexity of the hardware involved. In addition, since all operations required to prepare tire casings must be performed at one stationary location, the time required to perform all these operations is very long, and the finished prepared casing quality is often compromised. Thus, known tire casing preparation systems have been limited in productivity and the kind of tire casing preparation and quality consistency that can be achieved.

It is, therefore, an object of the invention to provide an improved tire casing preparation system capable of preparing tire casings rapidly and economically, and simultaneously provide consistently high quality prepared casings.

SUMMARY OF THE INVENTION

The tire casing preparation system of the present invention includes as its basic component a transfer machine associated with a plurality of work stations performing a variety of operations on a tire casing such as detreading, contouring, surface conditioning, dimensional gauging, defect detection, and adhesive treatment. While the multi-station transfer machine is disclosed as being preferably rotary in form, a linearly movable transfer machine is also within the scope of the present invention.

The transfer machine includes a rotary turntable having a plurality of chucking mechanisms for mounting tire casings as they are moved from one work station to another. The turntable is powered by a centrally located hydraulic unit of conventional design. Each of the chucking mechanisms is mounted on a corresponding radially extending spoke and includes its own hydraulic drive motor for rotating the tire casing which is mounted thereto. Air is supplied to the chucking mechanisms for permitting inflation of the tire casings when mounted. Similarly, hydraulic power is supplied to actuate the chucking mechanisms in a conventional manner. Finally, the turntable is propelled and indexed by hydro-mechanical devices to various work stations which will now be described.

Incoming worn tire casings are unloaded from an overhead conveyor and mounted on a chucking mechanism at a loading station. The worn tire casing is then transported by the turntable to a de-treading work station. At the de-treading station, the tire casing undergoes a rough machining or detreading operation by means of powered rotatable cutters which remove the remains of the worn tread from the tire casing. Then, the tire casing is transferred by the turntable to the next work station for a contouring or profiling operation.

The contouring or profiling work station performs a semi-rough machining operation on the tire casing, forming an arcuate smooth outer surface. At least two profiling tools are provided at the work station for performing the semi-rough operation. Following the completion of the tire casing outer surface contouring operation, the tire casing is transported to a finishing and surface conditioning work station.

The surface conditioning work station includes at least two powered rotating tools to perform the finishing and surface conditioning operation over the entire arcuate surface of the casing, including when required, the sidewall portions of the casing. Provision is also made at this work station for the dimensional gauging of the tire casing cross-sectional profile, and detecting of any defects that may exist within the casing. If the tire casing is belted, it may be necessary that detected damaged belts must be removed and replaced before proceeding further with the tire manufacturing process. The tire casing is, in this case, removed and transferred to a separate tire repair and debelting work area. After the repair and/or de-belting work has been performed, the casing is returned for further processing.

The tire casing is then transported to a work station where an adhesive solution is applied to the outer surface of the prepared casing. This work station includes an adhesive solution tank where the adhesive is held in storage and agitated until required. The finished adhesive treated tire casing is then transported from the adhesive application work station to an unloading station where it is removed and placed onto a conveyor assembly which transports the treated casing first through a drying tunnel and then to a separate work area where re-treading or re-manufacturing operations take place.

Thus, the tire casing preparation system of the present invention performs various operations on a tire casing including de-treading, contouring, surface conditioning, dimensional gauging, defect detection and adhesive treatment. While the individual work stations consist of conventional machining, gauging, defect detection, and adhesive treatment devices, the present invention performs unique and systematic operations on a tire casing which results in a more efficient and improved preparation of the tire casing for re-treading or re-manufacturing.

Other advantages and meritorious features of the tire casing preparation system of the present invention will be more fully understood from the following description of the invention, the appended claims and the drawings, a brief description of which follows.

BRIEF DESCRIPTION OF DRAWINGS

FIG. 2 is a side elevational view taken along line 2—2 in FIG. 1 for illustrating the loading and surface conditioning work stations.

FIG. 3 is a side elevational view taken along line 3—3 in FIG. 1 illustrating the de-treading and cementing work stations.

FIG. 4 is a side elevational view taken along line 4—4 in FIG. 1 illustrating the unloading and contouring work stations.

DETAILED DESCRIPTION OF THE INVENTION

Figure 1:
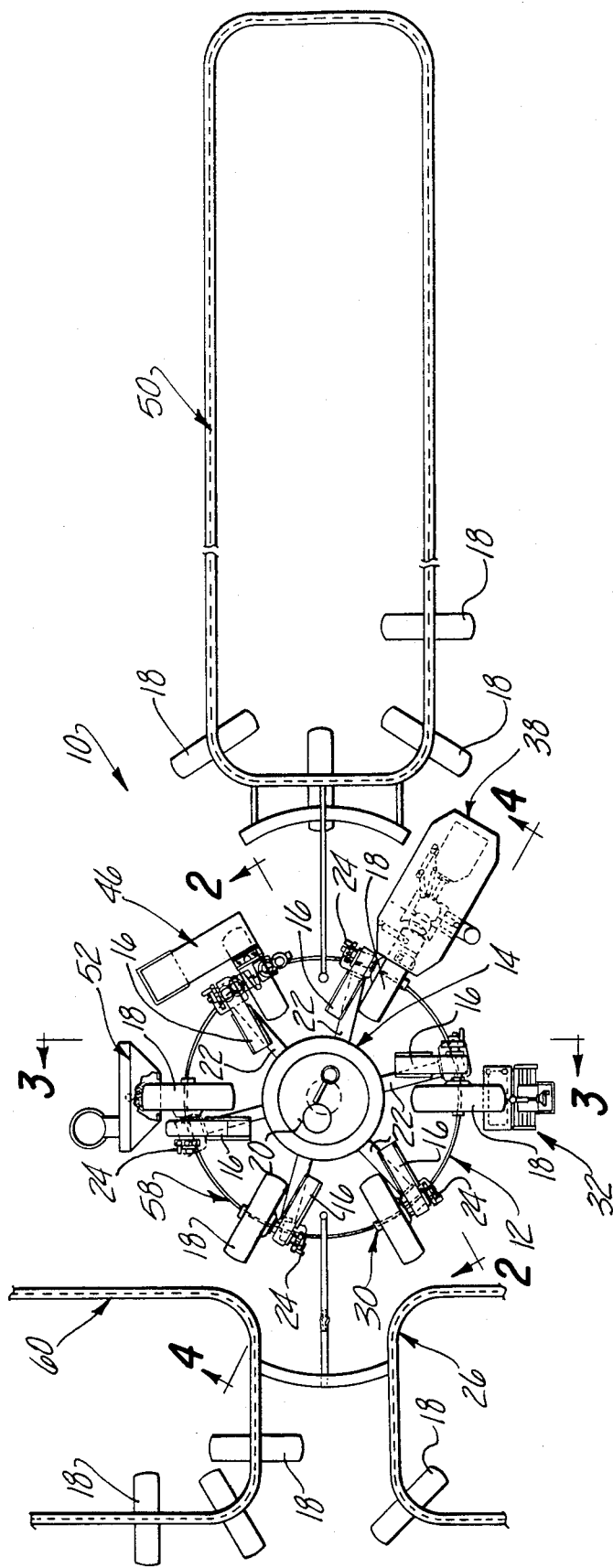
FIG. 1 is a top plan view of the tire casing preparation system of the present invention.

The tire casing preparation system 10 of the present invention includes as its basic component a transfer machine 12 associated with a plurality of work stations performing a variety of operations such as de-treading, contouring, surface conditioning, dimensional gauging, defect detection and adhesive treatment. While the multi-station transfer machine 12 is illustrated in FIGS. 1–4 as being rotary, a linearly movable transfer machine is also within the scope of the present invention.

The transfer machine 12 includes a rotary turntable 14 having a plurality of chucking mechanisms 16 for mounting tire casings 18 as they are moved from one work station to another. Turntable 14 is powered for rotation by a centrally located hydraulic unit 20 of conventional design. Each of the chucking mechanisms 16 is mounted on a corresponding radially extending spoke 22 and includes its own hydraulic drive motor 24 for rotating the tire casings 18 mounted thereto. Air is supplied through a main line to the center of turntable 14 and then through conduits along spokes 22 to chucking mechanism 16 for permitting inflation of tire casings 18. Similarly, hydraulic lines are connected from central hydraulic unit 20 to the drive motors 24 and chucking actuators (not shown). Finally, the electrical power is supplied to turntable 14, and chucking system 16 by means of a conventional slip ring which is connected to a power line located at the center of turntable 14. Turntable 14 is propelled and indexed by hydro- or electro-mechanical devices to various work stations which will now be described.

Referring to FIGS. 1 and 2, an incoming worn tire casing 18 is unloaded from overhead conveyor 26 and mounted on the chucking mechanism 16 at loading station 30. The worn tire casing 18 is then transferred by turntable 14 to de-treading station 32 as shown in FIGS. 1 and 3. At de-treading station 32, tire casing 18 undergoes a rough machining or de-treading operation by means of powered rotatable cutters 34 which are mounted on pedestal 36. This rough machining operation includes cutting a generally curvilinear surface across the top of the casing, hence removing the remains of the worn-out tread. Tire casing 18 is then transferred by turntable 14 to the next work station 38 for a contouring or profiling operation, also called a semi-rough maching operation.

FIGS. 1 and 4 illustrate the contouring or profiling work station 38 where such semi-rough machining operation is performed on the tire casing 18 to form a curvilinear or arcuate outer surface. At least two powered rotating tools 40 are provided at work station 38 to perfrom the semi-rough machining operation. These tools 40 are powered by motors 42 and the machined-off material is exhausted through duct 44. Following the completion of the semi-rough machining operation at work station 38, the tire casing is moved by turntable 14 to the finishing and surface conditioning work station 46.

Work station 46 includes at least two powered rotating tools 48 performing the finishing and surface conditioning over the entire arcuate surface of the casing including, when necessary, the sidewall portions after the semiroughing operation is performed at work station 38. Provision is also made by means of conventional detectors (not shown) for gauging the finished machined cross-sectional dimensions of the tire casing and detecting any defects that may exist. For example, if the tire casing is belted, it may be necessary that detected damaged belts be removed before proceeding further with the tire casing re-manufacturing process. If there are other defects in the tire casing or belts that need repair, the tire casing is removed at station 46 and transferred on conveyor 50 to a tire casing repair or de-belting work area and then returned after the repair and de-belting operations are completed for further processing.

Following the completion of the finishing and surface conditioning operation at work station 46, the tire casing 18 is then ready to be transported to the adhesive treatment work station 52 where an adhesive solution is applied to the outer conditioned surface of the tire casing. Work station 52 includes an adhesive solution tank 54 where the adhesive solution is held in storage and agitated until required. An adhesive solution spray booth equipped with conventional automatic spray guns (not shown) apply the adhesive solution to the tire casing 18.

The finished and prepared tire casing is transported from the adhesive solution application work station 52 to the unloading station 58 where it is removed and placed onto conveyor assembly 60. The treated tire casing 18 is then transported first through a drying tunnel and then to a separate work area where re-treading or re-manufacturing operations take place.

Figure 5:
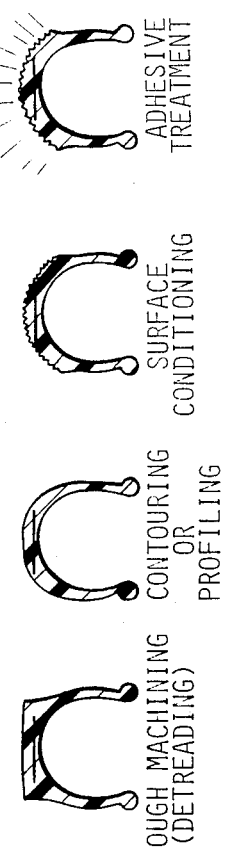
FIG. 5 is a schematic illustration of the operations performed on a tire casing by the present system.

FIG. 5 illustrates in brief summary form the various operations performed on the tire casing by the casing preparation system 10 including de-treading, contouring, surface conditioning, dimensional gauging, defect detection and adhesive treatment. The stationary work stations 32, 38, 46 and 52 consist of conventional machining, gauging and defect detection and adhesive solution application devices used in the machine tool industry such as milling cutters, profilers, grinders, dimensional gauging and defect detectors and automatic spray guns. However, the present invention performs unique and systematic operations on tire casings which results in improved preparation of the tire casings for re-treading or re-manufacturing.

It will be apparent to those skilled in the art that the foregoing disclosure is exemplary in nature rather than limiting, the invention being limited only by the appended claims.

I claim:

1. In a method of preparing tire casings having worn outer peripheral tread surfaces and sidewall surfaces as well as belt damages for re-treading or re-manufacturing, the steps comprising:
    (a) mounting a tire casing on a rotary transfer machine having a turntable which transports the casing sequentially between a plurality of work stations;
    (b) first transporting the tire casing by means of the transfer machine to a de-treading work station and performing a rough machining operation on the outer peripheral tread surface of the tire casing for removing the tread surface by cutting a curvilinear surface;
    (c) next transporting the tire casing by means of the transfer machine to a contouring or profiling work station, performing a semi-rough machining operation on the outer peripheral surface of the tire casing by machining the outer peripheral surface to an arcuate configuration;

(d) again transporting the tire casing by means of the transfer machine to a finishing and surface conditioning work station and performing a finishing and conditioning operation on the outer peripheral contoured surface of the tire casing including its sidewall portions, by machining the outer peripheral surface of the tire casing including dimensional gauging of the tire casing and detecting any defects that may exist therein;

(e) transporting the finished machined tire casing by means of the transfer machine to an adhesive solution application work station and applying such adhesive solution to the outer peripheral surface thereof; and (f) removing the finished and prepared tire casing from the transfer machine and transporting the tire casing to a separate work area for re-treading or re-manufacturing.

* * * * *